United States Patent [19]

Tamaru et al.

[11] 3,710,634
[45] Jan. 16, 1973

[54] TENSION DEVICE FOR CHAIN DRIVE

[75] Inventors: Hiroshi Tamaru, Tokorozawa; Hiroyuki Inoue, Hanno, both of Japan

[73] Assignee: Tsubakimoto Chain, Ltd., Joto-ku, Osaka, Japan

[22] Filed: June 15, 1971

[21] Appl. No.: 153,274

[30] Foreign Application Priority Data

June 16, 1970 Japan..............................45/59652

[52] U.S. Cl......................74/242.11 S, 74/242.11 R
[51] Int. Cl................................................F16h 7/12
[58] Field of Search.........74/242.1, 242.8, 242.14 R, 74/242.11 R, 242.11 A, 242.11 S, 242.11 C, 242.11 P, 242.11 E, 422

[56] References Cited

UNITED STATES PATENTS

| 2,475,426 | 7/1949 | Ewaldson | 74/242.1 R |
|---|---|---|---|
| 3,407,674 | 10/1968 | Pearce et al. | 74/242.11 R |
| 3,117,463 | 1/1964 | Brindle | 74/242.11 S |

Primary Examiner—Carlton R. Croyle
Assistant Examiner—Frank McKenzie
Attorney—E. F. Wenderoth et al.

[57] ABSTRACT

A tension device includes a cylinder with a chamber therein. A plunger having a rubber shoe on the outer end thereof slides within the cylinder and is urged outwardly therefrom by a coil spring. A pinion is eccentrically mounted to engage with a longitudinal rack on the surface of the plunger and is urged by a clip spring to move the plunger into the cylinder. The force of the coil spring is greater than that of the clip spring to normally urge the plunger outwardly from the cylinder and the rack out of engagement with the pinion due to the eccentric mounting of the pinion.

3 Claims, 2 Drawing Figures

3,710,634

HIROSHI TAMARU and
HIROYUKI INOUE,

INVENTORS

BY Wenderoth, Lind & Ponack
ATTORNEYS

TENSION DEVICE FOR CHAIN DRIVE

BACKGROUND OF THE INVENTION

The present invention relates to a device for tensioning a chain drive system.

More particularly, the present invention relates to such a device which continually tensions the chain drive, even during unusual shocks thereto.

Even more particularly, the present invention relates to such a tension device which maintains a uniform tension on chain drive even after extended wear thereto.

Chain drives are commonly used as power trains for a great many purposes. For instance, it is common practice to use chain drive power trains for operating automobiles having internal combustion engines. However, there are certain inherent disadvantages in using such chain drive power trains. Specifically, fluctuations in driving force exerted on the chains, as well as slack in the chain resulting from extended use thereof, cause power transmission to be uneven. This causes unacceptable vibration and noise in the chain drive system. Past attempts to compensate for or to eliminate such disadvantages have, for various reasons, been unacceptable.

OBJECTS AND BRIEF DESCRIPTION OF THE INVENTION

With the above disadvantages in mind, it is a primary object of the present invention to provide a tension device for chain drive systems. It is a further object of the present invention to provide such a tension device which compensates for fluxuation in driving forces exerted on the chain.

It is an even further object of the present invention to provide such a tension device which inherently compensates for additional chain slack due to elongation of the chain as a result of extended use thereof.

These objects are achieved in accordance with the present invention by the provision of a cylinder having a plunger slidable therein. A coil spring is positioned within the cylinder to urge the plunger therefrom. On the exterior end of the plunger is located a shoe which is adapted to be urged against the chain of the chain drive system to continually tension the chain. On a portion of the outer periphery of the plunger is formed a rack. Extending through the cylinder into the chamber thereof is a slot. A shaft is transversely mounted to cross the slot. Eccentrically mounted on the shaft is a pinion, adapted to engage with the rack. A rod or leaf spring is positioned with respect to the cylinder to urge the eccentrically mounted pinion into wedging engagement with the rack to force the plunger into the cylinder chamber.

Other objects, features and advantages of the present invention will be made clear from the following detailed description taken together with the accompanying drawings.

DETAILED DESCRIPTION OF THE INVENTION

With reference now to the drawings, a preferred embodiment of the present invention will be described in detail.

Figure 2:
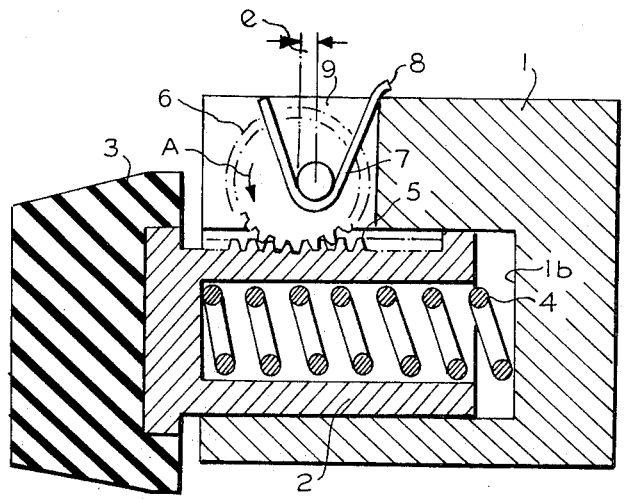
FIG. 2 is a cross-sectional view taken along line II—II of FIG. 1.

A cylinder 1 is adapted to be mounted adjacent a chain drive system (not shown) by convention mounting means such as 1a. Within cylinder chamber 1b of cylinder 1 is positioned for sliding movement a plunger 2. On the outer end of plunger 2 is mounted a shoe 3. Conveniently, shoe 3 is made of a pliable material such as rubber. Suitable means such as a coil spring 4 is provided within cylinder chamber 1b to urge plunger 2 outwardly thereof. Cylinder 1 is mounted adjacent the chain drive system such that shoe 3 is urged against the chain of the chain drive system by means of spring 4, to thereby tension the chain. The outer surface of plunger 2a has longitudinally thereon a rack 5. Extending through cylinder 1 into chamber 1b is a slot 9. Extending transversely across slot 9 and freely rotatable in cylinder 1 is a shaft 7. Eccentrically mounted on shaft 7 is a pinion 6, the gears on the outer periphery of which are adapted to engage with rack 5. A leaf or rod clip spring 8 is positioned on cylinder 1 and shaft 7 to continually urge pinion 6 to rotate counterclockwise as shown in FIG. 2 in the direction indicated by arrow A. This rotation is possible due to the fact that shaft 7 is eccentrically positioned through pinion 6 by a distance $e$. Accordingly, it will be seen from FIG. 2 that spring 8 continually urges pinion 6 into counterclockwise engagement with rack 5, to thereby urge plunger 2 into cylinder chamber 1b against the force of coil spring 4.

The operation of the tension device of the present invention will now be described.

Under normal running conditions, coil spring 4 is stronger than spring 8, and thus urges plunger 2 outwardly of cylinder chamber 1b. Thus, shoe 3 is normally urged against the chain of the chain drive system to impart the continuous tension thereto. Ordinary changes or fluctuations in the driving force of the chain are absorbed by spring 4. However, if an extraordinary shock or vibration occurs in the chain drive system, coil spring 4 would not be strong enough to absorb such shock, and the chain would thus tend to be relieved of tension.

Figure 1:
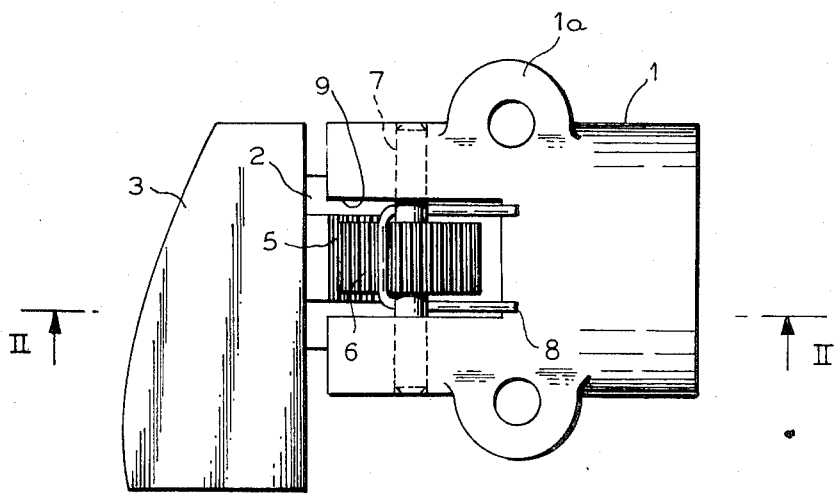
FIG. 1 is a plan view of a preferred embodiment of a tension device in accordance with the present invention.

However, at the occurrence of such extraordinary shock, plunger 2 is forced inwardly against spring 4. However, since spring 8 continually urges pinion 6 counterclockwise as shown in FIG. 2, the gears of pinion 6 would be wedged with rack 5 due to the eccentric mounting of pinion 6. Thus, upon the occurrence of an unusual shock to plunger 2, pinion 6 wedges against plunger 2, whereby shoe 3 remains in contact with the chain. When the extraordinary shock passes, spring 4 once again urges plunger 2 outwardly from cylinder chamber 1b. Since coil spring 4 is stronger than spring 8, and since pinion 6 can freely rotate in the clockwise direction pinion 6 will not interfere with the movement of plunger 2 outwardly from chamber 1b. Thus, it will be seen that the arrangement illustrated in FIGS. 1 and 2 inherently absorbs extraordinary changes in drive force occurring in the chain drive system, while still tensioning the chain.

Furthermore as the chain of the chain drive system becomes more slack through extended usage, coil spring 4 will normally urge plunger 2 further outwardly from cylinder chamber 1b. However, such movement will not be opposed by pinion 6, since pinion 6 is freely rotatable in the clockwise direction due to its eccentric mounting.

Furthermore, the device of the present invention has the further advantage that if pinion 6 loses a tooth from the outer periphery thereof, the next tooth will readily be urged by spring 8 into engagement with rack 5, due to the eccentric mounting of the pinion.

It is to be understood that the tension device of the present invention may readily be adjusted by changing the eccentricity $e$ of pinion 6, or by changing the pitch of the rack 5 and pinion 6.

Thus, there is provided a tension device for tensioning chain drive systems which will continue to impart a substantially uniform tension, regardless of increased slack in the chain or regardless of unusual driving force imparted to the chain.

Although a single embodiment of the invention has been described in detail, such description is intended to be illustrative only, and not restrictive, since many details of the construction of the invention may be altered or modified without departing from the spirit or scope thereof.

What is claimed is:

1. A tension device for imparting tension to the chain of a drive chain system, said device comprising a cylinder adapted to be mounted adjacent said system, said cylinder having a cylinder chamber therein; a plunger mounted for sliding movement within said chamber, said plunger having a longitudinal rack on the outer surface thereof; a chain engaging shoe mounted on the outer end of said plunger; means for urging said plunger outwardly of said chamber; an eccentrically mounted pinion positioned to engage said rack; and means for urging said pinion into engagement with said rack to move said plunger into said chamber.

2. A device as claimed in claim 1, further comprising a slot extending through said cylinder into said chamber, and a shaft extending transversely across said slot, said pinion being eccentrically mounted on said shaft.

3. A device as claimed in claim 2, wherein said means for urging said plunger comprises a coil spring, and said means for urging said pinion comprises a clip spring, said coil spring being stronger than said clip spring.

* * * * *